United States Patent [19]

McMichael

[11] Patent Number: 5,039,389

[45] Date of Patent: Aug. 13, 1991

[54] MEMBRANE/ELECTRODE COMBINATION HAVING INTERCONNECTED ROADWAYS OF CATALYTICALLY ACTIVE PARTICLES

[75] Inventor: James W. McMichael, Lake Jackson, Tex.

[73] Assignee: The Dow Chemical Company, Midland, Mich.

[21] Appl. No.: 388,297

[22] Filed: Jul. 27, 1989

Related U.S. Application Data

[63] Continuation of Ser. No. 944,278, Dec. 19, 1986, abandoned.

[51] Int. Cl.$^5$ .............................................. G25B 11/20
[52] U.S. Cl. ...................................................... 204/282
[58] Field of Search ................ 204/282, 283, 284, 98

[56] References Cited

U.S. PATENT DOCUMENTS

| | | | |
|---|---|---|---|
| 3,282,875 | 11/1966 | Connolly et al. | 260/29.6 |
| 3,632,498 | 1/1972 | Beer | 204/290 F |
| 3,909,378 | 9/1975 | Walmsley | 204/98 |
| 4,025,405 | 5/1977 | Dotson et al. | 204/98 |
| 4,061,549 | 12/1977 | Hazelrigg, Jr. et al. | 204/98 |
| 4,065,366 | 12/1977 | Oda et al. | 204/98 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,142,005 | 2/1979 | Caldwell et al. | 427/126 |
| 4,151,052 | 4/1979 | Goto et al. | 204/95 |
| 4,176,215 | 11/1979 | Molnar et al. | 521/27 |
| 4,178,218 | 12/1979 | Seko | 204/98 |
| 4,192,725 | 3/1980 | Dotson et al. | 204/98 |
| 4,209,635 | 6/1980 | Munekata et al. | 560/183 |
| 4,212,713 | 7/1980 | Suhara et al. | 204/98 |
| 4,214,971 | 7/1980 | Heikel et al. | 204/290 F |
| 4,251,333 | 2/1981 | Suhara et al. | 204/98 |
| 4,270,996 | 6/1981 | Suhara et al. | 204/98 |
| 4,272,353 | 6/1981 | Lawrance et al. | 204/283 |
| 4,276,146 | 6/1981 | Coker et al. | 204/266 |
| 4,293,394 | 10/1981 | Darlington et al. | 204/98 |
| 4,299,674 | 11/1981 | Korach | 204/98 |
| 4,299,675 | 11/1981 | Korach | 204/98 |
| 4,315,805 | 2/1982 | Darlington et al. | 204/98 |
| 4,319,969 | 3/1982 | Oda et al. | 204/98 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 F |
| 4,340,680 | 7/1982 | Asawa et al. | 521/27 |
| 4,345,986 | 8/1982 | Korach | 204/266 |
| 4,357,218 | 11/1983 | Seko | 204/98 |
| 4,358,412 | 11/1982 | Ezzell et al. | 260/968 |
| 4,358,545 | 11/1982 | Ezzell et al. | 521/27 |
| 4,364,815 | 12/1982 | Darlington et al. | 204/283 |
| 4,386,987 | 6/1983 | Covitch et al. | 156/155 |
| 4,389,297 | 6/1983 | Korach | 204/282 |
| 4,394,229 | 7/1983 | Korach | 204/98 |
| 4,416,932 | 11/1983 | Nair | 428/209 |
| 4,417,969 | 11/1983 | Ezzell et al. | 204/252 |
| 4,457,822 | 7/1984 | Asano et al. | 204/252 |
| 4,462,877 | 7/1984 | Ezzell | 204/98 |
| 4,465,580 | 8/1984 | Kasuya | 204/290 R |
| 4,469,579 | 9/1984 | Covitch et al. | 204/283 |
| 4,470,889 | 9/1984 | Ezzell et al. | 204/98 |
| 4,478,695 | 10/1984 | Ezzell et al. | 204/98 |
| 4,498,942 | 2/1985 | Asano et al. | 156/151 |
| 4,545,886 | 10/1985 | de Nora et al. | 204/252 |
| 4,581,116 | 4/1986 | Plowman et al. | 204/284 |
| 4,610,762 | 9/1986 | Birdwell | 204/1 R |
| 4,650,551 | 3/1987 | Carl et al. | 204/59 R |
| 4,650,711 | 3/1987 | Carl et al. | 428/265 |
| 4,652,356 | 3/1987 | Oda et al. | 204/98 |
| 4,654,104 | 3/1987 | McIntyre et al. | 156/276 |
| 4,655,886 | 4/1987 | Oda et al. | 204/98 |
| 4,655,887 | 4/1987 | Oda et al. | 204/98 |
| 4,661,218 | 4/1987 | Oda et al. | 204/98 |

FOREIGN PATENT DOCUMENTS 0027009  4/1981  European Pat. Off. .
2069006A  8/1981  United Kingdom .

Primary Examiner—John F. Niebling
Assistant Examiner—Kathryn Gorgos

[57] ABSTRACT

The invention is a membrane/electrode combination comprising: an ion exchange membrane having a plurality of interconnected roadways of catalytically active particles bonded to at least one face of the membrane.

20 Claims, 1 Drawing Sheet

MEMBRANE/ELECTRODE COMBINATION HAVING INTERCONNECTED ROADWAYS OF CATALYTICALLY ACTIVE PARTICLES

CROSS-REFERENCE TO RELATED APPLICATIONS

This is a continuation of application Ser. No. 06,944,278 filed Dec. 19, 1986 now abandoned.

BACKGROUND OF THE INVENTION

"M & E" stands for Membrane and Electrode. A M & E is a structure composed of an ion exchange membrane having a plurality of electrically conductive, catalytically active particles present on one, or both, surfaces of an ion exchange membrane. The electrically conductive, catalytically active particles serve as a particulate electrode when the M & E is used in an electrochemical cell. M & E structures are sometimes called solid polymer electrolyte structures or SPE structures.

"M & E cells" are electrochemical cells employing an M & E structure. Such cells can be operated as an electrolytic cell for the production of electrochemical products, or they may be operated as fuel cells for the production of electrical energy. Electrolytic cells may, for example, be used for the electrolysis of an alkali metal halide such as sodium chloride or for the electrolysis of water.

M & E cells are rather well known in the art a d are discussed in detail in the following patents: 4,293,394; 4,299,674; 4,299,675; 4,319,969; 4,345,986; 4,386,987; 4,416,932; 4,457,822; 4,469,579; 4,498,942; 4,315,805; 4,364,815; 4,272,353; and 4,394,229.

In M & E cells, frequently, a gaseous product is produced at the catalytically active particles. The gas bubbles off the catalytically active particles (serving as an electrode) into an electrolyte that contacts the M & E during cell operation. However, the gaseous products that are produced within the pores of the catalytically active particles, or at the catalytically active particle/membrane interface, must diffuse out through the pores of the catalytically active particles before they can bubble into the electrolyte and be removed. Because gases are produced faster than they can escape, they build up within the catalytically active particles or build up at the catalytically active particles/membrane interface and cause a decrease in the efficiency of the operation of the M & E cell. Even worse, some gases permeate the membrane and contaminate the product(s) produced on the other side of the membrane. In chlor-alkali cells, where hydrogen is produced on one side of the membrane and chlorine is produced on the other side of the membrane, hydrogen can permeate the membrane and contaminate the chlorine, or vice-versa. This contamination can be hazardous because of the explosive nature of a chlorine/hydrogen mixture.

The prior art has attempted to minimize the problem of gaseous buildup at the M & E by making porous electrodes for M & E's. See, for example U.S. Pat. No. 4,276,146. Some porous M & E electrodes may be formed by including a pore former, such as sodium chloride, in the catalytically active particles during the M & E preparation process. The sodium chloride is later leached out leaving a porous M & E structure. However, such coatings do not solve the gas diffusion problem because a significant reduction in the hydrogen contamination of the chlorine is not realized. Also, the porous catalytically active particles are fragile, and do not hold up well to the action of gas evolution, which leads to a loss of M & E catalytically active particles.

The present invention provides an M & E which is especially designed to minimize the permeation of gaseous products through the membrane and into the opposing side of the cell, and to improve the electrical efficiency of the cell.

M & E electrode coatings are made using materials that are rather expensive. It would be advantageous to reduce the amount of material used in the M & E electrode without sacrificing the catalytic activity of the coating. The present invention provides a M & E having substantially less catalytic material without sacrificing the catalytic activity of the coating.

In M & E's of the prior art, a woven, window-screen electrically conductive screen was used to support the M & E. However, window screen is not entirely satisfactory because of its uneven surface. When window-screen type electrically conductive screens are pressed into catalytically active particles or the membrane film, some portions of the window-screen penetrates further than other portions of the window-screen. This causes an uneven contact of the window-screen with the electrode and membrane, resulting in uneven transfer of electrical energy across the face of the membrane. In addition, some parts of the membrane are more likely to rupture when the window-screen penetrates the membrane.

Another problem with the use of window-screen electrically conductive screens concerns the protection of the membrane from being torn or ruptured by mattresses (resilient devices) which may be used to hold a current collector against the catalytically active particles on the surface of the membrane. Window-screen does not provide as much protection as is provided by the substantially flat electrically conductive screens used in the present invention.

The present invention provides a support structure for M & E's which minimize most of the problems with using a window-screen type structure.

SUMMARY OF THE INVENTION

The invention is a membrane/electrode combination comprising: an ion exchange membrane having a plurality of interconnected roadways of catalytically active particles bonded to at least one face of the membrane.

DETAILED DESCRIPTION OF THE INVENTION

Figure 1:
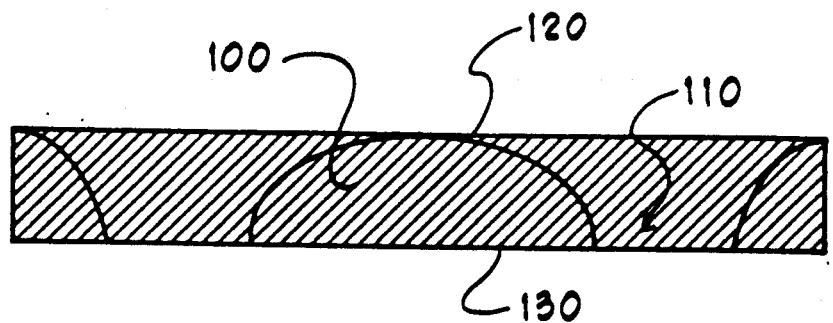
FIG. 1 shows a side view of one type of substantially flat screen template that is suitable for use in the present invention.

It has been discovered that M & E's having interconnected roadways of catalytically active particles, as opposed to the M & E's of the prior art that have large coupons of catalytically active particles, work with very high efficiency when used in an electrochemical cell. It appears that the increased efficiency results from the open areas of the membrane between the interconnected roadways of catalytically active particles. These open areas provide a space for the removal of gases generated at the catalytically active surface. In addition, the small width of the interconnected roadways provide a short pathway for gases that form in the area between the catalytically active particles and the membrane to escape, thus minimizing the gas blockage of the membrane. The pattern of the catalytically active particles is designed so that the pathway for the escape of gases from and around the interconnected roadways of catalytically active material is less than the resistance to flow through the membrane. Thus, it is easier for the gases to escape through and around the interconnected roadways of catalytically active particles than it is to permeate the membrane and escape into the opposing cell compartment.

The size, shape and thickness of the interconnected roadways of catalytically active particles of the present invention depends upon the type of ion exchange membrane being used. That is, a membrane with a high resistance to gas permeation may allow the use of larger interconnected roadways of catalytically active particles, while a membrane having a low resistance to the permeation of gases may require smaller interconnected roadways of catalytically active particles. For example in a chlor-alkali electrolytic cell, a bilayer ion exchange membrane having an overall thickness of about 4 mils (0.1 millimeter), which has a layer of polymer having sulfonic ion exchange groups approximately 3.5 mils (0.09 millimeter) thick and a layer of polymer having carboxylic ion exchange groups approximately 0.5 mil (0.01 millimeter) thick may have interconnected roadways of catalyst having a dimensions of less than about about 1 centimeter in width. Preferably, however, the interconnected roadways of catalytically active particles have widths of less than about 0.5 centimeters. Most preferably, the interconnected roadways of catalytically active particles have widths of less than about 0.2 centimeters.

The porosity of the layer of catalytically active particles serving as the M & E electrode is also very important in allowing gas which is formed during cell operation to escape. The M & E's of the prior art had microporous openings. These worked to a very limited extent to provide gases a pathway for escape. However, it has been discovered that macroporous, rather than microporous openings are highly desirable because they provide plenty of room for the gases to escape. Thus, the screen templates used in the present invention allow for the preparation of M & E's which are macroporous, as opposed to the microporous M & E's of the prior art. The macroporous nature of the M & E's of the present invention allow the electrochemical cells in which they are used to operate at a higher efficiency.

The screen template used in the present invention is a substantially flat screen that has a plurality of spaced apart openings. Preferably, the screen is substantially completely flat on at least one surface. The flatness seems to be particularly desirable for forming the M & E article because it makes it possible to form a M & E that has a well-defined, clearly controlled, open area and, likewise, a coated area. The fact that the catalytic coating is placed on the screen template and later embedded into the membrane leaves a substantial portion of the membrane exposed. This minimizes the amount of catalytic material that is used for forming the M & E and maximizes the area for the escape of gaseous products from the electrode coating because there is plenty of open area. The screen template is preferably a metallic screen although it can be made of substantially any material.

FIG. 1 shows a side view of one type of screen template that is suitable for use in the present invention. The metal 100 has one flat side 130 and one rounded side 120. Although the rounded side 130 has a substantially flat portion. The screen template has an opening 110 connecting the its two sides.

Figure 2:
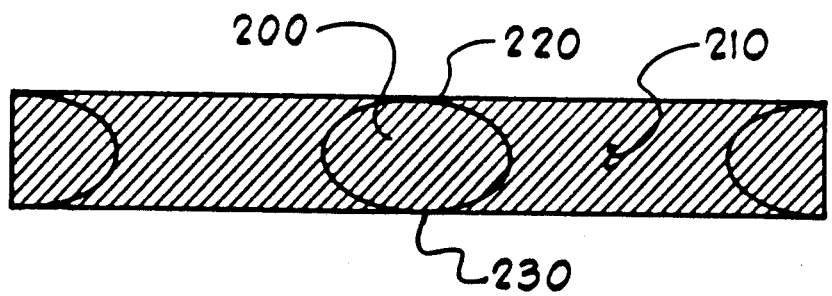
FIG. 2 shows a side view of another type of substantially flat screen template that is suitable for use in the present invention.

FIG. 2 shows a side view of another type of screen template that is suitable for use in the present invention. The metal 200 has two rounded sides 220 and 230. However, the rounded sides 220 and 230 have substantially flat portions. The screen template has an opening 210 connecting its two sides.

Figure 3:
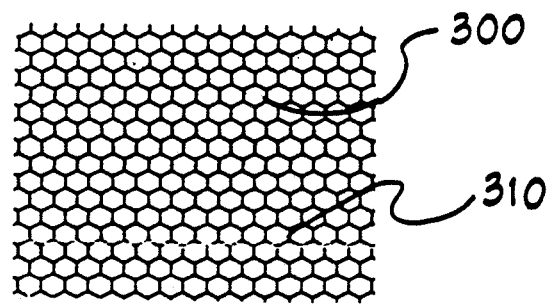
FIG. 3 shows a top view of a section of the interconnected roadway pattern of the catalytically active particles deposited on the membrane.

FIG. 3 shows a top view of a section of the interconnected roadway pattern 300 of the catalytically active particles deposited on the membrane. Between the interconnected roadway pattern are a plurality of openings 310. The openings are not interconnected.

The thickness of the screen is not critical to the successful operation of the present invention. However, for convenience, and ease of handling, the screen preferably will not exceed the thickness of the of the membrane.

The width or diameter of the interconnected roadways of catalytically active particles bonded to membrane, is preferably less than about one centimeter. More preferably, the width or diameter is less than about 0.5 centimeter, and most preferably the width is less than about 0.2 centimeter. Dimensions larger than these ranges result in increased gas contamination of the products produced in the opposing side of the cell, because the gas finds less resistance in going through the membrane to the opposing side of the cell than it finds in escaping through the catalytically active particles.

A particularly preferred method for forming the interconnected roadways of the present invention involves the use of an electroformed screen template. Following the method of the present invention, the interconnected roadways of catalytically active particles match the pattern of the screen template used. Thus, the discussion about the shape and size of the screen template would, therefore, describe the shape and size of the interconnected roadway of catalytically active particles. It has been found that preferably the screen template has from about 25 to about 75% open area. More preferably, the screen template has from about 40 to about 60% open area. Most preferably, the screen template has from about 45 to about 55% open area. This provides sufficient open area for the gases formed at the M & E to escape.

Optionally, the screen template can have no openings around its peripheral edge. This provides a nonporous area where a gasket can be placed when the M & E is assembled with other components to form an electrochemical cell.

A screen template that seems to be particularly suitable for forming the interconnected roadways of the present invention is an electroformed screen template having a plurality of openings that are spaced apart from each other.

Electroforming is the process in which metal is electrochemically deposited on a matrix in a photographically determined pattern. When the matrix is removed, the remaining screen is photo-perfect and substantially flat. Because the holes are produced by a buildup of metal around each of them, the perforations have a characteristic arch shape. This shape offers smooth passage of the materials being screened and prevents buildup of deposits. Single-sided electroforming produces essentially conical shaped holes; double-sided electroforming produces bi-conical shaped holes.

Electroformed holes seem to be preferred over punched holes, and holes formed by other means because the electroformed holes are smooth and do not tear the membrane when they are contacted therewith. Likewise, the electroformed screen templates are superior to a woven cloth or a window-screen wire mesh because they are substantially flat and do not unevenly penetrate the membrane when embedded therein.

The shape of the interconnected roadways of catalytically active particles is not limited, and can assume any number of possible shapes, such as squares, rectangles, triangles, and the like. Furthermore, the arrangement of the catalytically active interconnected roadways on the membrane does not necessarily need to conform to any particular pattern, either repeating or nonrepeating. It is believed that the improvements realized by this invention are caused by the increased ability of the produced gases to diffuse out of the porous electrode film and into the bulk of solution, rather than diffusion through the membrane proper and into the electrolyte on the opposite side of the membrane. While there are many factors that determine the diffusion path of gas produced in the porous electrode, it is believed that the open areas of the membrane of the present invention are arranged intimately with the catalytic areas in such a way as to provide lateral pathways for the produced gases to reach the bulk of solution that are not achieved by the prior art. By lateral pathways we mean diffusion paths from the gas producing regions in the catalytically active interconnected roadways to the bulk of solution that extend essentially parallel to the membrane surface. Furthermore, as these open areas are not producing gaseous products, these areas are not providing a pressure and/or concentration gradient that would work against the desired transport of gaseous products out of the electrocatalytic regions of the M&E assembly and into the bulk of solution.

Experiments show that the extent of gaseous contamination is related more directly to the % open area on the membrane rather than the radius of the interconnected roadways. If this is true, then the limitations and preferred ranges of % open area are also quite important.

The M & E structure of the present invention includes embodiments where catalytically active particles and substantially flat screen templates are bonded to or embedded in one, or both, sides of the membrane. However, the present invention requires that at least one of the electrodes be in the form of a plurality of catalytically active particles contacting the membrane. These plurality of catalytically active particles are what make a catalytically active, electrode. The electrode can serve, during cell operation, as either a cathode or an anode. Optionally, both electrodes can be catalytically active particles embedded into opposite sides of the membrane. For the purposes of the present discussion, the forms of both electrodes will be described as though they are catalytically active particles and will also be described as if they are separate, conventional electrodes.

Conventional anodes are usually hydraulically permeable, electrically conductive structures made in a variety of shapes and styles including, for example, a screen of expanded metal, perforated plate, punched plate, unflattened diamond shaped expanded metal, or woven metallic wire. Metals suitable for use as anodes include tantalum, tungsten, columbium, zirconium, molybdenum, and preferably, titanium and alloys containing major amounts of these metals.

Optionally, the anode may be composed of a plurality of catalytically active particles embedded into the membrane. Materials suitable for use as electrocatalytically active anode materials include, for example, activating substances such as oxides of platinum group metals like ruthenium, iridium, rhodium, platinum, palladium, either alone or in combination with an oxide of a film-forming metal. Other suitable activating oxides include cobalt oxide either alone or in combination with other metal oxides. Examples of such activating oxides are found in U.S. Pat. Nos. 3,632,498; 4,142,005; 4,061,549; and 4,214,971.

Conventional cathodes are usually hydraulically permeable, electrically conductive structures made in a variety of shapes and styles including, for example, a screen of expanded metal, perforated plate, punched plate, unflattened diamond shaped expanded metal, or woven metallic wire. Metals suitable for use as cathode include, for example, copper, iron, nickel, lead, molybdenum, cobalt, alloys including major amounts of these metals, such as low carbon stainless steel, and metals or alloys coated with substances such as silver, gold, platinum, ruthenium, palladium, and rhodium.

Optionally the cathode may be a plurality of catalytically active particles embedded into the membrane. Materials suitable for use as electrocatalytically active cathode materials include, for example, platinum group metal or metal oxide, such as ruthenium or ruthenium oxide. U.S. Pat. No. 4,465,580 describes such cathodes.

The catalytically active particles, whether used as an anode or as a cathode are preferably finely divided and have a high surface area. For example, in the case of an oxygen or hydrogen electrode fuel cell, platinum black (surface area greater than 25 m$^2$/gram) or high surface area (800–1800 m$^2$/g) platinum on activated carbon powder (average particle size 10–30 microns) are quite suitable for use as the anode and the cathode. In the case of a chlorine cell, an may be prepared in which ruthenium dioxide particles are prepared by thermal decomposition of ruthenium nitrate for 2 hours at 450° C. The resulting oxide may then be ground using a mortar and pestle and the portion which passed through a 325 mesh sieve (less than 44 microns) used to prepare an electrode.

Membranes that are suitable for use in the present invention may be constructed of a fluorocarbon-type material or of a hydrocarbon-type material. Such membrane materials are well known in the art. Preferably, however, fluorocarbon materials are generally preferred because of their chemical stability.

Non-ionic (thermoplastic) forms of perfluorinated polymers described in the following patents are particularly suitable for use in the present invention because they are easily softened by heating and make it easy to bond the membrane to the electrode and to the flat screen template. Membranes which are suitable are described in the following patents: 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412;

4,358,545; 4,417,969; 4,462,877; 4,470,889; and 4,478,695; European Patent Application 0,027,009. Such polymers usually have equivalent weight in the range of from about 500 to about 2000. The membranes can be a single layer or they can be a multilayer membrane. Some of the more useful membranes are bilayer membranes having sulfonic ion exchange groups in one layer and carboxylic ion exchange groups in the other layer.

To allow the catalytically active particles to be embedded into the fluorocarbon membrane, it is desirable for the fluorocarbon membrane to be in its thermoplastic form. It is in a thermoplastic form when it is made and before it is converted into an ion exchange form. By thermoplastic form, it is meant, for instance, that the membrane has $SO_2X$ pendant groups, where X is $-F$, $-CO_2$, $-CH_3$, or a quaternary amine, rather than ionically bonded $SO_3Na$ or $SO_3H$ pendant groups.

Particularly preferred fluorocarbon materials for use in forming membranes are copolymers of monomer I with monomer II (as defined below). Optionally, a third type of monomer may be copolymerized with I and II.

The first type of monomer is represented by the general formula:

$$CF_2=CZZ' \qquad (I)$$

where:

Z and Z' are independently selected from the group consisting of $-H$, $-Cl$, $-F$, or $-CF_3$.

The second type of monomer consists of one or more monomers selected from compounds represented by the general formula:

$$Y-(CF_2)_a-(CFR_f)_b-(CFR_{f'})_c-O-[CF(CF_2X)-CF_2-O]_n-CF=CF_2 \qquad (II)$$

where

Y is selected from the group consisting of $-SO_2Z$, $-CN$, $-COZ$, and $C(R^3f)(R^4f)OH$;

Z is $-I$, $-Br$, $-Cl$, $-F$, $-OR$, or $-NR_1R_2$;

R is a branched or linear alkyl radical having from 1 to about 10 carbon atoms or an aryl $R^3f$ and $R^4f$ are independently selected from the group consisting of perfluoroalkyl radicals having from 1 to about 10 carbon atoms;

$R_1$ and $R_2$ are independently selected from the group consisting of $-H$, a branched or linear alkyl radical having from 1 to about 10 carbon atoms or an aryl radical;

a is 0-6;
b is 0-6;
c is 0 or 1;
provided a+b+c is not equal to 0;
X is $-Cl$, $-Br$, $-F$, or mixtures thereof when n>1;
n is 0 to 6; and $R_f$ and $R_{f'}$ are independently selected from the group consisting of $-F$, $-Cl$, perfluoroalkyl radicals having from 1 to about 10 carbon atoms and fluorochloroalkyl radicals having from 1 to about 10 carbon atoms.

Particularly preferred is when Y is $-SO_2F$ or $-COOCH_3$; n is 0 or 1; $R_f$ and $R_{f'}$ are $-F$; X is $-Cl$ or $-F$; and a+b+c is 2 or 3.

The third, and optional, monomer suitable is one or more monomers selected from the compounds represented by the general formula:

$$Y'-(CF_2)_{a'}-(CFR_f)_{b'}-(CFR_{f'})_{c'}-O-[CF(CF_2X')-CF_2-O]_{n'}-CF=CF_2 \qquad (III)$$

where:

Y' is $-F$, $-Cl$ or $-Br$;
a' and b' are independently 0-3;
c is 0 or 1;
provided a'+b'+c' is not equal to 0;
n' is 0-6;

$R_f$ and $R_{f'}$ are independently selected from the group consisting of $-Br$, $-Cl$, $-F$, perfluoroalkyl radicals having from about 1 to about 10 carbon atoms, and chloroperfluoroalkyl radicals having from 1 to about 10 carbon atoms; and X' is $-F$, $-Cl$, $-Br$, or mixtures thereof when n'>1.

Conversion of Y to ion exchange groups is well known in the art and consists of reaction with an alkaline solution. The membrane may be converted to its ionic form by reacting it with, in the case of $-SO_2F$ pendant groups, 25 weight % NaOH under the following conditions: (1.) immerse the film in about 25 weight percent sodium hydroxide for about 16 hours at a temperature of about 90° C.; (2.) rinse the film twice in deionized water heated to about 90° C., using about 30 to about 60 minutes per rinse. The pendant group is then in the $-SO_3^-Na^+$ form. Cations other than $-Na^+$ can be made to replace the $Na^+$ if practical (such as $-H^+$).

Preparation of the supported M & E of the present invention involves a plurality of steps. First, one must select a membrane film and a screen template Then a coating of catalytically active particles is placed on the screen template. There are a number of suitable ways for depositing the particles onto the first face of the flat metal. For example, one can form a slurry of the catalytically active particles and paint or spray the slurry onto the metal. Likewise, the screen template can be dipped into a solution or dispersion of the catalytic material. A variety of printing techniques can also be used to apply the solution/dispersion to the membrane.

A particularly suitable method for depositing the catalytic particles onto the screen template involves forming a solution/dispersion of the catalytically active particles in a dispersant.

Solvents/dispersants suitable for use in the present invention should have the following characteristics:

a boiling point less than about 110° C.;
a density of from about 1.55 to about 2.97 grams per cubic centimeter; and
a solubility parameter of from greater than about 7.1 to about 8.2 hildebrands.

It has been found that solvents/dispersants represented by the following general formula are particularly preferred provided they also meet the characteristics discussed above (boiling point, density, and solubility parameter):

$$XCF_2-CYZ-X'$$

wherein:

X is selected from the group consisting of $-F$, $-Cl$, $-Br$, and $-I$;

X' is selected from the group consisting of $-Cl$, $-Br$, and $-I$;

Y and Z are independently selected from the group consisting of $-H$, $-F$, $-Cl$, $-Br$, $-I$ and $-R'$;

R' is selected from the group of perfluoroalkyl radicals and chloroperfluoroalkyl radicals having from 1 to 6 carbon atoms.

The most preferred solvents/dispersants are 1,2-dibromotetrafluoroethane (commonly known as Freon 114 B 2)

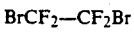

and 1,2,2-trichlorotrifluoroethane (commonly known as Freon 113):

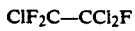

Of these two solvents/dispersants, 1,2-dibromotetrafluoroethane is the most preferred solvent/dispersant. It has a boiling point of about 47.3° C., a density of about 2.156 grams per cubic centimeter, and a solubility parameter of about 7.2 hildebrands.

1,2-dibromotetrafluoroethane is thought to work particularly well because, though not directly polar, it is highly polarizable. Thus, when 1,2-dibromotetrafluoroethane is associated with a polar molecule, its electron density shifts and causes it to behave as a polar molecule. Yet, when 1,2-dibromotetrafluoroethane is around a non-polar molecule, it behaves as a non-polar solvent/dispersant. Thus, 1,2-dibromotetrafluoroethane tends to dissolve the non-polar backbone of polytetrafluoroethylene and also the polar pendant groups. The solubility parameter of 1,2-dibromotetrafluoroethane is calculated to be from about 7.13 to about 7.28 hildebrands.

Optionally, and preferably, the solution/dispersion may contain a binder to help hold the catalytically active particles together and bond them to the screen template. Preferred binders include a variety of fluoropolymers including such materials as polytetrafluoroethylene, perfluorinated polymers and copolymers, and ionomers. Particularly preferred as a binder is an ionomer having the same or a similar composition as the ion exchange membrane. Examples of the types of ionomers that are suitable for use as a binder are the same as those shown to be suitable for use as the ion exchange membrane, as discussed above. The solvent dispersant discussed above is a solvent for the ion exchange polymer. Thus a solution/dispersion can be formed that contains catalytically active particles, an ion exchange fluoropolymer and a solvent/dispersant. This solution/dispersion helps bond the catalytically active particles together and to the screen template.

When a solution/dispersion is prepared, the concentration of the ionomer is preferably from about 4 weight percent to about 20 weight percent. The concentration of the catalytically active particles is from about 0.1 weight percent and higher. There is no set maximum limit. Since the catalytic activity depends upon the type of catalyst being used, and since all catalysts perform slightly differently, one should experiment with the particular catalyst being used to optimize the catalyst lever. However, when ruthenium oxide is used, levels from about 2 weight percent to about 20 weight percent have been found to be suitable. Optionally an electrically conductive material can be added to the solution/dispersion to increase the electrical conductivity of the catalyst deposited on the membrane. Silver is commonly added, for example, at a level of from about 60 to about 90 weight percent. Other suitable metals for use as the electrically conductive material include such things as nickel, tantalum, platinum and gold.

The preparation of the solution/dispersion is accomplished using the following procedures. First the components are weighed and blended with each other dry. Then sufficient solvent/dispersant is added to cover the dry ingredients. The mixture is then blended in a ball mill for a time period of from about 4 hours to about 24 hours to obtain a uniform mixture. This also gives time for the ionomer to be broken up and at least partially dissolved. This aids in bonding the catalytically active particles together. Then, the mixture is allowed to settle and the excess solvent/dispersant is decanted off. At this point, the mixture usually contains about 25 weight percent solids.

The flat screen template upon which the solution/dispersion is to be deposited, optionally cleaned or treated in such a way as to assure uniform contact with the solution/dispersion. The flat screen template can be cleansed by washing with a degreaser or similar solvent followed by drying to remove any dust or oils from the flat screen template. Metallic screens may be acid etched, then washed with a solvent to promote adhesion, if desired, unless the metal is new, in which case degreasing is sufficient.

After being cleaned, the flat screen templates may be preconditioned by heating or vacuum drying prior to contact with the solution/dispersions and the coating operation. Temperatures and pressures in the following ranges are preferably used: about 20 millimeters mercury at about 110° C. or thereabout is sufficient in all cases; however, mild heat is usually adequate, on the order of about 50° C. at atmospheric pressure.

A variety of methods are suitable, and may be used, for fixing the solution/dispersion to the flat screen template. One suitable method involves dipping the flat screen template into the solution/dispersion, followed by air drying and sintering at the desired temperature with sufficient repetition to build the desired thickness. Spraying the solution/dispersion onto the flat screen template may also be used as an advantage for covering large or irregular shapes. Pouring the solution/dispersion onto the flat screen template is sometimes used. Painting the solution/dispersion with brush or roller has been successfully employed. In addition, coatings may be easily applied with metering bars, knives, or rods. Usually, the coatings or films are built up to the thickness desired by repetitive application. A plurality of coats of the solution/dispersion may be applied to the coupon to build up the desired thickness of the catalytically active particles. Between coats, it is preferably to dry the solution/dispersion by removing the solvent/dispersant. This can be accomplished by allowing the solvent/dispersant to evaporate, by heating, or by vacuum drying. Thickness of the coating may be of almost any desired thickness, however, thickness as low as 20 to 50 microns have been found to work perfectly well. In some instances, coating thickness as low as about 5-10 microns have been found to be suitable. Optionally, the coatings can be sintered between coatings and before the coatings are transferred to the membrane.

Then, the coated screen template is placed against one face of the membrane and the combination is subjected to pressure. Optionally, heat may be applied during the pressing cycle to enhance transfer of the catalytically active particles to the membrane and to enhance adhesion of the catalytically active particles to the membrane. However, the combination should not be heated above temperatures of about 450° F. (230° C.) because the membrane will become sufficiently soft and will adhere to the screen template. Likewise, pressures in excess of about 100 pounds per square inch (7 kilograms per square centimeter) should be avoided because they will press the membrane through the holes in the screen template. When the membrane is in its hydrogen form, it should not be heated above temperatures greater than about 180° C. because the membrane tends to decompose. When pressure and heat are both used, the time of pressing should be relatively short, such as about 30 seconds or less. The time is estimated to be the time necessary to bring the membrane up to the stated temperature. However, when no heat is used, the combination can be pressed up to about 5 minutes.

After the catalytically active particles have been transferred to the membrane, the pressure and/or heat are removed and the screen is peeled off the membrane, leaving an interconnected roadway pattern of catalytically active particles on the membrane.

It is then necessary to more permanently fix the interconnected roadways of catalytically active particles to the membrane. This may be accomplished by subjecting the coated membrane to additional pressure and heat. The coated membrane (when it its thermoplastic form or in its sodium form) may, for example, be heated to temperatures as high as about 500° F. (260° C.) for a time period of from about 30 seconds to about 1 minute to cause the components to bond together. When the membrane is in its hydrogen form, it should not be heated above temperatures greater than about 180° C. because the membrane tends to decompose. These temperatures soften the binder in the catalytically active particle solution/dispersion and soften the membrane, allowing the two to bond to each other. Too low a temperature or too short a time of heating results in the catalytically active particles not being completely bonded to the membrane. Too long a time results in too much blending of the particles with the membrane. Too high a temperature causes the membrane to melt which prevents the proper M & E from being formed.

It is sometimes beneficial to heat the combination under pressures of up to about 3.5 kilograms per square centimeter to ensure good bonding of the components. However, pressures greater than about 3.5 kilograms per square centimeter tend to flatten the combination too much.

Preferably, a heated press is used to bond the components. Although a variety of procedures may be suitable be used, one that has been found to be particularly useful involves forming a sandwich of the components between two platens, an upper platen and a lower platen. On top of the lower platen is a screen of polytetrafluoroethylene paper, the membrane having the catalytically active particles coated thereon, another screen of polytetrafluoroethylene paper, a rubber screen to provide resilience, another screen of polytetrafluoroethylene paper, and finally, the upper platen. This sandwich is then placed in a heated press and heated to under pressure to effect the bonding.

The fact that the first face of the screen template is substantially flat minimizes the penetration of the catalytically active particles into the space between the solid portions of the screen template and the membrane. In other words, the catalytically active solution/dispersion does not "run" when it is applied to the membrane. Even the screen template shown in FIG. 2 is sufficiently flat to minimize the "running" of the catalytically active solution/dispersion.

Since the catalytic coating covers only a portion of the membrane, less catalytically active material is used. Yet, the catalytic activity of the M & E is at least equivalent to the M & E's of the prior art.

It has been discovered that, even though the present invention uses only a portion of the catalytically active particles that would be used in a full coupon M & E, one can reduce the concentration of catalytically active particles even further. For example, a typical solution/dispersion of catalytically active particles contains about 75 weight percent silver, about 16 weight percent ruthenium oxide and about 9 weight percent ionomer. However, using the techniques of the present invention, a solution containing about 83 weight percent silver, about 8 weight percent ruthenium oxide, and about 9 weight percent ionomer, works substantially as well as the one having 16 weight percent ruthenium oxide. This represents a potential savings of approximately one-half of the expensive ruthenium oxide catalyst.

The methods and techniques for using the membranes of the present invention having a plurality of interconnected roadways of catalytically active particles bonded to at least one face of the membrane is well known in the art. Generally, however, a current collector is pressed against the interconnected roadways of catalytically active particles and is connected with a power supply (in the case of an electrolytic cell) or with a power consuming device (in the case of fuel cells or batteries). The current collector conducts electrical energy to (or from) the interconnected roadways of catalytically active particles. It has been found that a particularly suitable current collector is an electrically conductive screen having a pattern identical to the screen template used to form the interconnected roadways of catalytically active particles. This will assure that each roadway of catalytically active particles can transfer electrical energy to (or from) the current collector. Optionally, on may use a resilient device, such as a mattress, to hold the current collector against the coated membrane.

The M & E structure of the present invention is useful in a wide variety of electrochemical cells including, for example, fuel cells for the continuous production of electrical energy; electrolysis cells for the production of chemical products (such as chlorine and caustic from a sodium chloride brine solution or hydrogen and oxygen from water); and batteries for the intermittent production of electrical energy.

EXAMPLE 1

A mixture of about 76 grams of silver particles, about 16 grams of ruthenium oxide particles, and about 8 grams of carboxylic ion exchange fluoropolymer particles were dissolved and suspended in $BrCF_2$—$CF_2Br$ in a ball mill. First the components were weighed and blended with each other dry. Then sufficient solvent/dispersant was added to cover the dry ingredients. The mixture was then blended in a ball mill for a time period of about 24 hours to obtain a uniform mixture. This also gave time for the ionomer to be broken up and at least partially dissolved. Then, the mixture was allowed to settle and the excess solvent/dispersant was decanted off. At this point, the mixture contained about 25 weight percent solids.

An approximately 56 square centimeter sample of an electroformed nickel screen template from Perforated Products, Inc., in Brookline, Mass., a division of Veco International Corporation was used to receive the solution/dispersion. The screen had a plurality of 0.029 inch (0.7 millimeters) in diameter evenly distributed across its face. There were a sufficient number of holes to make the screen approximately 50% open. The screen had a thickness of about 0.0028 inch (0.1 millimeters).

The screen was dipped into the silver/ruthenium oxide/ionomer suspension and was allowed to dry at room temperature. The dipping and drying step was repeated 5 additional times, for a total of six cycles. The coating was allowed to air dry between coatings. The coated screen was then sintered for about 5-10 minutes at a temperature of about 260° C. Then, the screen template was contacted with a bilayer ion exchange membrane (in its thermoplastic form) that had sulfonic ion exchange groups in one layer and carboxylic ion exchange groups in the other layer. The screen template was contacted with the side of the membrane having the carboxylic ion exchange groups.

The combination was placed in a heated, hydraulic press and pressed at about 50 pounds per square inch (3.5 kilograms per square centimeter) at a temperature of about 450° F. (230° C.) for from about 30 to about 60 seconds to bond the membrane to the coated screen template.

The combination was removed from the press and cooled. The screen was removed, leaving a plurality of interconnected roadways of catalytically active particles bonded to the membrane.

I claim:

1. A membrane/electrode combination comprising: an ion exchange membrane having a plurality of catalytically active particles bonded to at least one face of the membrane in an interconnected roadway pattern, wherein said interconnected roadway pattern is an open, clearly defined, geometrically regular pattern which leaves portions of the membrane uncoated and exposed.

2. The membrane/electrode combination of claim 1 wherein the interconnected roadways cover from about 40 to about 60% of one face of the membrane.

3. The membrane/electrode combination of claim 1 wherein the interconnected roadways cover from about 45 to about 55% of one face of the membrane.

4. The membrane/electrode combination of claim 1 wherein the membrane is a fluorocarbon-type material.

5. The membrane/electrode combination of claim 1 wherein the membrane is a hydrocarbon-type material.

6. The membrane/electrode combination of claim 1 wherein the membrane is in its thermoplastic state.

7. The membrane/electrode combination of claim 1 wherein the membrane is a copolymer of a first type monomer and a second type monomer, wherein first type of monomer is represented by the general formula:

$$CF_2=CZZ' \quad (I)$$

where:
Z and Z' are independently selected from the group consisting of —H, —Cl, —F, or —CF$_3$; and
the second type of monomer consists of one or more monomers selected from compounds represented by the general formula:

$$Y-(CF_2)_a-(CFR_f)_b-(CFR_f')_c-O-[CF(CF_2X')-CF_2-O]_n-CF=CF_2 \quad (II)$$

where:
Y is selected from the group consisting of —SO$_2$Z, —CN, —COZ, and C(R$^3$f)(R$^4$f)OH;
Z is —I, —Br, —Cl, —F, —OR, or —NR$_1$R$_2$;
R is a branched or linear alkyl radical having from 1 to about 10 carbon atoms or an aryl radical;
R$^3$f and R$^4$f are independently selected from the group consisting of perfluoroalkyl radicals having from 1 to about 10 carbon atoms;
R$_1$ and R$_2$ are independently selected from the group consisting of —H, a branched or linear alkyl radical having from 1 to about 10 carbon atoms or an aryl radical;
a is 0-6;
b is 0-6;
c is 0 or 1;
provided a+b+c is not equal to 0;
X is —Cl, —Br, —F, or mixtures thereof when n is 0 to 6; and
R$_4$ and R$_f$ are independently selected from the group consisting of —F, —Cl, perfluoroalkyl radicals having from 1 to about 10 carbon atoms and fluorochloroalkyl radicals having from 1 to about 10 carbon atoms.

8. The membrane/electrode combination of claim 7 wherein Y is —SO$_2$F or —COOCH$_3$; n is 0 or 1; R$_f$ and R$_f'$ are —F; X is —Cl or —F; and a+b+c is 2 or 3.

9. The membrane/electrode combination of claim 7 wherein the copolymer also includes a third type of monomer selected from the compounds represented by the general formula:

$$Y'-(CF_2)_{a'}-(CFR_f)_{b'}-(CFR_f')_{c'}-O-[CF(CF_2X')-CF_2-O]_{n'}-CF=CF_2 \quad (III)$$

where:
Y' is —F, —Cl or —Br;
a' and b' are independently 0-3;
c is 0 or 1;
provided a'+b'+c' is not equal to 0;
n' is 0-6;
R$_4$ and R$_f$ are independently selected from the group consisting of —Br, —Cl, —F, perfluoroalkyl radicals having from about 1 to about 10 carbon atoms, and chloroperfluoroalkyl radicals having from 1 to about 10 carbon atoms; and
X' is —F, —Cl, —Br, or mixtures thereof when n' > 1.

10. The membrane/electrode combination of claim 1 wherein the plurality of catalytically active particles are selected from the group consisting of oxides ruthenium, iridium, rhodium, platinum, palladium, either alone or in combination with an oxide of a film-forming metal and cobalt oxide either alone or in combination with other metal oxides.

11. The membrane/electrode combination of claim 1 wherein the catalytically active particles are blended with a binder.

12. The membrane/electrode combination of claim 11 wherein binder is a fluorocarbon polymer.

13. The membrane/electrode combination of claim 12 wherein the fluorocarbon polymer is the same polymer which forms at least a part of the membrane.

14. The membrane/electrode combination of claim 1 wherein the pattern of interconnected roadway pattern has a width that does not exceed about one centimeter.

15. The membrane/electrode combination of claim 1 wherein the pattern of interconnected roadway pattern has a width that does not exceed about one-half centimeter.

16. The membrane/electrode combination of claim 1 wherein the pattern of interconnected roadway pattern has a width that does not exceed about 0.2 centimeter.

17. The membrane/electrode combination of claim 1 wherein an electrically conductive metal is distributed among the catalytically active particles.

18. The membrane/electrode combination of claim 17 wherein the electrically conductive particles are selected from the group consisting of silver, nickel, tantalum, platinum, and gold.

19. The membrane/electrode combination of claim 1 wherein the roadways a thickness as low as about 20 microns.

20. The membrane/electrode combination of claim 1 wherein the interconnected roadway pattern has a thickness as low as about 5 microns.

* * * * *

UNITED STATES PATENT AND TRADEMARK OFFICE
CERTIFICATE OF CORRECTION

PATENT NO. : 5,039,389

DATED : August 13, 1991

INVENTOR(S) : James W. McMichael

It is certified that error appears in the above-identified patent and that said Letters Patent is hereby corrected as shown below:

Col. 14, line 14, change "when n is 0 to 6; and" to read -- when n>1; n is 0 to 6; and--.

Col. 14, line 16, change "R4 and $R_f$" to read --$R_f$ and $R_f$--.

Signed and Sealed this

Twenty-seventh Day of April, 1993

Attest:

MICHAEL K. KIRK

Attesting Officer

Acting Commissioner of Patents and Trademarks